United States Patent [19]

Zenzefilis

[11] Patent Number: 4,692,821

[45] Date of Patent: Sep. 8, 1987

[54] DISC MEMORY STORAGE APPARATUS AND METHOD

[76] Inventor: George E. Zenzefilis, 27 Vientos Rd., Camarillo, Calif. 93010

[21] Appl. No.: 815,371

[22] Filed: Dec. 31, 1985

[51] Int. Cl.$^4$ .................... G11B 5/55; G11B 27/10
[52] U.S. Cl. ................................. 360/78; 360/51; 360/106
[58] Field of Search ................. 360/51, 78, 106

[56] References Cited

U.S. PATENT DOCUMENTS

| | | | |
|---|---|---|---|
| 3,384,880 | 5/1968 | Duinker et al. | 340/174.1 |
| 3,701,846 | 10/1972 | Zenzefilis | 178/6.6 DD |
| 3,706,857 | 12/1972 | Lynott | 360/78 |
| 4,175,270 | 11/1979 | Zenzefilis | 358/128 |
| 4,300,174 | 11/1981 | Harman et al. | 360/78 |
| 4,322,759 | 3/1982 | Zenzefilis | 360/33 |
| 4,388,655 | 4/1984 | Zenzefilis | 360/19 |

OTHER PUBLICATIONS

"On Extremely High Density Digital Recording-"—IEEE Transactions on Magnetics, vol. Mag-10, No. 2, p. 368, Jun. 1974 by John C. Mallinson.

Primary Examiner—George G. Stellar
Attorney, Agent, or Firm—Henry M. Bissell

[57] ABSTRACT

A movable head support arm establishes a curved path and orientation for the head along a memory disc such that the head gap is maintained tangential to the path. A variable delay of the track reference, established as a function of track position, is developed to insure coherence of stored information from track to track in the direction of the head path.

23 Claims, 16 Drawing Figures

| NUMERICAL INTEGRATION PROGRAM E (Rectilinear Head Travel). |
|---|
| Input Registers: R2=ri (path X tangent circle, inch), R3=r1 (innermost track, inch) R4=$\hat{\rho}$ (degr), R5=$\Delta$S (uniform TPP step intervals, inch), R6=$\nu$ (delay factor, $\mu$s/degr) RI=r2 (outermost track, inch), R7=$n$ (track increment per printing) |

| | | | | | | | | | | | |
|---|---|---|---|---|---|---|---|---|---|---|---|
| 000. | --- | 015. | GTO D | 030. | 0 | 045. | $\div$ | 060. | COS | 075. | PSE | 090. | PRT X |
| 001. | *LBL E | 016. | *LBL D | 031. | RCL C | 046. | RCL 8 | 061. | RCL 5 | 076. | GTO D | 091. | RCL 1 |
| 002. | FIX | 017. | RCL 2 | 032. | - | 047. | $\div$ | 062. | x | 077. | *LBL A | 092. | PRT X |
| 003. | DSP 9 | 018. | RCL 8 | 033. | RCL 4 | 048. | R→D | 063. | ST+ 8 | 078. | SPC | 093. | RCL 7 |
| 004. | RCL 4 | 019. | $\div$ | 034. | - | 049. | CHS | 064. | 1 | 079. | RCL 0 | 094. | RCL B |
| 005. | COS | 020. | COS$^{-1}$ | 035. | STO 1 | 050. | RCL D | 065. | ST+ 0 | 080. | PRT X | 095. | + |
| 006. | RCL 5 | 021. | STO C | 036. | RCL 0 | 051. | + | 066. | RCL 8 | 081. | RCL D | 096. | STO B |
| 007. | x | 022. | RCL 8 | 037. | X=0? | 052. | STO D | 067. | RCL I | 082. | RCL 6 | 097. | RTN |
| 008. | STO A | 023. | $X^2$ | 038. | GSB A | 053. | RCL C | 068. | X≤Y? | 083. | x | | |
| 009. | 0 | 024. | RCL 2 | 039. | RCL 4 | 054. | + | 069. | R/S | 084. | PRT X | | |
| 010. | STO B | 025. | $X^2$ | 040. | COS | 055. | STO C | 070. | RCL 0 | 085. | RCL 8 | | |
| 011. | STO D | 026. | - | 041. | RCL 5 | 056. | 9 | 071. | RCL B | 086. | PRT X | | |
| 012. | STO 0 | 027. | $\sqrt{X}$ | 042. | x | 057. | 0 | 072. | X≤Y? | 087. | RCL 9 | | |
| 013. | STO 3 | 028. | STO 9 | 043. | RCL C | 058. | RCL 1 | 073. | GSB A | 088. | PRT X | | |
| 014. | STO 8 | 029. | 9 | 044. | SIN | 059. | - | 074. | RCL 0 | 089. | RCL C | | |

Output Registers: 6 numbers are issued per printing corresponding to the following: R0=N (track number), RDxR6 = $\tau$ (delay producing TPP, $\mu$s), R8=r (track radius, inch) R9=X (total distance moved, inch), RC=$\hat{\theta}$ (angular TPP coordinate, degr), R1=$\hat{\phi}$ (degr)

*Fig. 12*

| NUMERICAL INTEGRATION PROGRAM e (Rotary Head Travel). |
|---|
| Input Registers: R1=$\gamma$ (head arm pivot location, inch), R2=$\beta$ (head arm radius, inch) R3=r1 (innermost track, inch), R4=$\hat{\rho}$ (degr), R5=$\Delta$S(uniform TPP step intervals, inch) R6=$\nu$ (delay factor, $\mu$s/degr), RI=r2 (outermost track, inch), R7=$n$ (track increment per printing). |

| | | | | | | | | | | | | | |
|---|---|---|---|---|---|---|---|---|---|---|---|---|---|
| 000. | --- | 017. | RCL 8 | 034. | $X^2$ | 051. | RCL 0 | 068. | RCL E | 085. | RCL 0 | 102. | 9 |
| 001. | *LBL e | 018. | $X^2$ | 035. | RCL 8 | 052. | X=0? | 069. | RCL 4 | 086. | PSE | 103. | 0 |
| 002. | FIX | 019. | RCL 2 | 036. | $X^2$ | 053. | GSB a | 070. | - | 087. | GTO d | 104. | RCL E |
| 003. | DSP 9 | 020. | $X^2$ | 037. | - | 054. | RCL A | 071. | COS | 088. | *LBL a | 105. | - |
| 004. | RCL 4 | 021. | - | 038. | RCL 1 | 055. | RCL 8 | 072. | RCL 5 | 089. | SPC | 106. | RCL 4 |
| 005. | COS | 022. | RCL 1 | 039. | $X^2$ | 056. | $\div$ | 073. | x | 090. | RCL 0 | 107. | + |
| 006. | RCL 5 | 023. | $X^2$ | 040. | + | 057. | RCL E | 074. | ST+ 8 | 091. | PRT X | 108. | PRT X |
| 007. | x | 024. | + | 041. | 2 | 058. | SIN | 075. | 1 | 092. | RCL D | 109. | RCL 7 |
| 008. | STO A | 025. | 2 | 042. | $\div$ | 059. | $\div$ | 076. | ST+ 0 | 093. | RCL 6 | 110. | RCL E |
| 009. | 0 | 026. | $\div$ | 043. | RCL 2 | 060. | R→D | 077. | RCL 8 | 094. | x | 111. | + |
| 010. | STO B | 027. | RCL 8 | 044. | $\div$ | 061. | RCL D | 078. | RCL I | 095. | PRT X | 112. | STO B |
| 011. | STO D | 028. | $\div$ | 045. | RCL 1 | 062. | X≠Y | 079. | X≤Y? | 096. | RCL 8 | 113. | RTN |
| 012. | STO 0 | 029. | RCL 1 | 046. | $\div$ | 063. | - | 080. | R/S | 097. | PRT X | | |
| 013. | RCL 3 | 030. | $\div$ | 047. | COS$^{-1}$ | 064. | STO D | 081. | RCL 0 | 098. | RCL 9 | | |
| 014. | STO 8 | 031. | COS$^{-1}$ | 048. | STO 9 | 065. | RCL C | 082. | RCL B | 099. | PRT X | | |
| 015. | GTO d | 032. | STO C | 049. | + | 066. | + | 083. | X≤Y? | 100. | RCL C | | |
| 016. | *LBL d | 033. | RCL 2 | 050. | STO E | 067. | STO C | 084. | GSB a | 101. | PRT X | | |

Output Registers: 6 numbers are issued per printing corresponding to the following: R0=N (track number), RDxR6 = $\tau$ (delay producing TPP, $\mu$s), R8=r (track radius, inch) R9=$\hat{\sigma}$ (head arm total angle, degr), RC=$\hat{\theta}$ (angular TPP coordinate, degr), & $\hat{\phi}$ (degr)

*Fig. 13*

DISC MEMORY STORAGE APPARATUS AND METHOD

BACKGROUND OF THE INVENTION

1. Field of the Invention

This invention relates to information recording apparatus using magnetic discs, rigid or flexible, for computer or for television purposes, and its aim is to maximize the information capacity of every disc surface. In particular, it relates to special methods and apparatus for increasing substantially the total number of recorded tracks, while at the same time equalizing their output signal properties.

2. Description of the Prior Art

Substantial effort and resources have been invested in magnetic disc recorders, particularly for computer applications. These machines are produced in very large yearly quantities and they have become an indispensable complement of every computer, mainly because they possess the ability to access rapidly any disc track. Their earlier rival, two or three decades ago, the magnetic drum, has practically disappeared, in spite of the fact that the drum excels in one important aspect over the disc: In the former all magnetic tracks have the same length and the same properties but in the disc the track length varies proportionally to its radius and the other track properties vary even more drastically. As a result, for the great majority of magnetic disc recorders whose discs rotate at a constant angular velocity and process information at a constant rate, the following disadvantages exist: First, only the innermost track is utilized fully at the maximum density of magnetic transitions, $\delta_i$; the density $\delta_j$ of the other tracks diminishes more and more as their radius increases and this deficiency decreases the disc utilization by a factor of 1.5, for the usual case where the ratio of the innermost track radius over the outermost, $r_i/r_o$, is approximately 0.5. Second, the head voltage produced in the playback mode and its frequency content varies as the radius, while its Signal to Noise Ratio (SNR) varies as the square. Obviously if all tracks could have uniform utilization and performance the quality of the machine would be enhanced and also its capacity would be increased. If, for instance, all tracks were to have the same SNR, the total capacity would increase by a factor of 2.33 for the same case as before, that is $r_i/r_o=0.5$, as will be shown in the description of the preferred embodiments section. In the past, machines have been made to correct the track density deficiency by dividing the disc surface into several zones, each processed at a different angular velocity, slower toward the disc's edge. This solution, however, is not acceptable at present because it forces the computer associated with this recorder type to change its information processing rate according to the zone. Another more practical approach is that of slanting the head gap variably as, for example, disclosed in the U.S. Pat. No. 3,384,880 of Duinker. But it is directed toward rectilinearly moving heads, while for reasons of cost and simplicity rotationally moving heads are more desirable. In addition, Duinker's method, which equalizes for constant output by increasingly slanting more heavily toward the disc's edge and thus continuously exchanging for effects due to increased relative velocity exactly opposing effects due to increased gap slant angle $\psi(\psi=90°-\phi$, $\phi$=angle between gap and track tangent), does not provide for phase coherence, the subject covered immediately below.

This invention eliminates the polarization difficulty of magnetic recording in the direction of the head's gap, meaning that to read any track recorded previously the gap must be both oriented in the same direction and stay within the track confines, for a wide range of cases. The first of these requirements is known in the industry as the Azimuth Alignment (AA) and the second as the Track Registration (TR). The two densities defining the total information stored in every disc surface, track density known as Tracks Per Inch (TPI) and circumferential binary digit density known as Bits Per Inch (BPI) and their product which characterises the storage efficiency in terms of imprints per square inch, are not compatible with both AA and TR with existing techniques. For example, for satisfactory Azimuth Alignment either TPI must increase and tracks must be narrow, or BPI must decrease and magnetic imprints must be placed far enough from each other. Also, to make the Track Registration easier TPI must decrease and tracks must be wide, but this will make the Azimuth Alignment more difficult, hence requiring a reduction of BPI.

This incompatibility becomes especially troublesome when considering the latest type of magnetic disc recorders using a servomechanism to correct for the various disturbances in achieving proper track registration by means of prerecorded and non-erasable special information known as "imbedded", in certain preassigned locations in every track known as "address and servo" sectors, because in order to read it correctly good registration must already exist and yet the object of the imbedded servo information is precisely to achieve good registration. Thus, the magnetic polarization and the incompatibilities it generates make the magnetic recording for computers inferior to the optical, for example, in total storage per square inch because its highest radial density at present (1985) is approximately 1,500 TPI while the optical discs have already exceeded 20,000 TPI.

Now, in the U.S. Pat. Nos. 3,701,846 4,175,270 4,322,759 and 4,388,655 of Zenzefilis, apparatus and methods are shown whereby the recording is changed into a new trackless type by means of recording all tracks coherently and contiguously and thus permitting video information to be read at all times without any track registration requirements and even when the head is moving from one location to another. Such machines have already been constructed and are able to process radial densities of more than 10,000 elemental tracks per inch. Coherence is achieved by taking all of the following measures:

(A) By breaking the incoming information stream into sections, and the sections into elements which are recorded on consecutive tracks in precise juxtaposition, the nature of the elements being such as to change smoothly from track to track.

(B) By making all tracks at least contiguous, and in some cases overlapped.

(C) By pulse length encoding the information content of each element using fixed angular disc positions such as a real or derived clock track as reference.

(D) By aligning corresponding elemental magnetic transitions from track to track so that they merge by means of aligning the head gap to be tangent on its path.

(E) By preassigning the two magnetization states between elemental transitions from track to track so they are the same.

Thus, all tracks disappear and all imprints merge forming long elemental lines, which are boundaries between the two states of magnetization of the disc's surface, either smooth if the corresponding elemental information is not changing from track to track or containing minute wiggles if there is change. All elemental lines have the same shape as the effective transducer's progress path (TPP). Although this transformation is specifically meant for TV signals in the above patents, it is also applicable to the address/servo sectors since their content varies smoothly from track to track. But the combination of variable slant and coherence requires TPPs that cannot be implemented by a simple mechanism.

It is the object of the herein described invention to expand and improve both Duinker's and Zenefilis' patents in order to achieve the following objectives either separately or simultaneously.

The Duinker variable slant is expanded to permit implementation by simple rotational head excursion movements as well.

The Zenzefilis' transducer progress path is expanded and improved by means of variably delaying the magnetic disc's reference position or positions or clock prior to recording the information meant to acquire phase coherence and be trackless by a delay function $\tau = g(r)$, so that the effective TPP on the disc is considerably changed from the apparent TPP. The effective TPP is neither a straight line for rectilinearly moving heads, nor a circular segment for rotationally moving heads, but a curve resembling an involute having at each radial distance the tangential inclination, $\phi$, needed to meet the particular requirement of equalizing the head output and also variably narrow the recorded tracks in order to accomodate more tracks.

Another object of this invention is to provide encoding means to record information which changes smoothly or predictably from track to track, such as the track serial numbers, or their radial distance, or a sector's serial number, etc., coherently and tracklessly, in order to transform the address sectors into areas of transverse elemental lines all having the general shape of the effective TPP. The actual computer information is still in the form of discrete tracks which are placed, as is usual, in between the address sectors. These tracks however, change progressively in width, becoming thinner toward the disc's edge, in exact correspondence to the elemental tracks within the address sectors, by virtue of the fact that the heads have the same inclination angle $\phi$ as the elemental lines either automatically so if the address sectors are prerecorded using the machine itself as a servowriter, or by construction so if the magnetic discs are prerecorded elsewhere by another machine.

3. Applicable Documents.

The statement earlier that the head output SNR varies as the square of the disc's radius can be supported by an article entitled, "On Extremely High Density Digital Recording", published in the IEEE Transactions on Magnetics, Vol. Mag-10, NO. 2, June 1974, page 368, by John C. Mallinson.

SUMMARY OF THE INVENTION

In brief, methods and apparatus embodying the invention involve as a first approach the mounting of the heads on a mechanism for movement along an involute curve having as its basic circle's center either the center of rotation of the magnetic discs or another center at a small shift distance (approximately one-quarter of the basic circle radius) from the former, in which case the shifted basic circle's radius is about three-fourths of the concentric one. The first choice produces constant head voltage waveform outputs independent of the processed track's radius and equal to the waveform produced by a track having the same radius as the involute's basic circle if recorded ordinarily (i.e. the head gap being perpendicular to track) and with the same signal, and simultaneously it produces phase coherence for information changing smoothly from track to track and transforms the recording into a trackless form if the proper encoding scheme is used and the tracks made contiguous. The second choice produces constant SNR signal outputs, also independent of the processed track's radius, the SNR of all tracks being that of the smallest magnetic track tangent to the shifted involute's basic circle, had this track been recorded ordinarily without a gap slant, and also produces a trackless recording if the same procedure is followed during recording as in the first choice. There is a third choice as well: A shift distance in-between the two extremes, as discussed earlier, and a basic circle of corresponding in proportion radius, provides a blend of characteristics involving output voltages decreasing with the track radius and SNRs increasing to satisfy particular system requirements, and it also provides for trackless recording if the same recording procedures as before are followed. In all the above cases the head gap is always tangent to the Transducer's Progress Path (TPP). The mechanism referred to in the beginning of this section can be a toothed rack on which the head assembly is mounted, engaging a stationary gear whose pitch circle is the stated basic circle. All head gap centers coincide in perpendicular (in reference to the disc surfaces) projection with the rack's pitch plane and all gap lines are perpendicular to it. As a second approach, the mechanism of generating involutes and involving toothed racks and gears as discussed above can be very substantially simplified by inverting the relative motion of some parts and by changing the orientation of others.

Thus instead of having the basic circle gears stationary and the head gap centers trace the involute curves, the head assembly is mounted on a rectilinearly moving carriage with the head gap lines forming an angle $p$ with the carriage path and the occurrence of the disc index is appropriately delayed. This implementation will produce the same paths for all three of the choices defined earlier. In the case of the first choice (i.e. constant output) the formula of the index delay versus the carriage position is quite simple: The delay is proportional to the carriage's position. For the remaining choices the formula is lengthy and it is presented in the form of a computer program. An instrument also is devised, an integrator, producing mechanically the required delays considerably more rapidly if less accuracy is acceptable.

As a third approach, the situation is further simplified, again achieving the same type of output chosen, that is Constant Output or Constant SNR or In-Between, if instead of the rectilinearly moving carriage the heads are mounted on a rotating arm, as in many ordinary machines, but with the head gap lines forming a new angle $p$ with the arm's axis and with delaying appropriately the occurrence of the index. In this case also the formula of the index delay versus the head arm's angle is lengthy and it is presented again as a computer program. For faster determinations the same instrument as above can be used.

As a fourth approach, if the desired coherence is to be given only to the prerecorded servo information, which is the case of disc drives used for computers, the delaying of the disc index is eliminated during the ordinary usage of the machine and is used only once during its construction by its "Servowriter"; or, to simplify still further the process, during the preparation of the individual discs by their own Servowriter or even by a one-to-one copying process. With this approach the heads are mounted either on a rectilinearly moving carriage or on a rotating arm and find and locate themselves accurately on the wanted track by information read in the prerecorded and curvilinear address sectors, which are trackless, following normal practices of machines provided with imbedded servo information. This approach also permits any of the output choices. Not withstanding which approach is chosen two significant objects will have been reached: The total information capacity of any ordinary machine can be very substantially increased and the head outputs can be altered as to be more uniform with an easy modification. And by using still thinner track heads the recording limit can be reached in the future whereby the track width is equal or even smaller than the recorded circumferential wavelength, as is the case at present with optical recording.

It should also be noted that these new features can be acquired by many of the latest computer recorders without major mechanical modifications, in particular by the type known as "Winchester Drives" which can accept innovations readily because they are not required to abide by accepted standards, having no disc interchangeability requirements. For example, in many rotational Drives which use imbedded servo information to locate accurately on tracks, or even in many others using a dedicated disc surface for the same purpose, the only needed modifications in mechanical parts involve shortening the head arm's length and increasing its angular travel, reorienting the flexible head holder and reorienting the head itself on the head holder.

BRIEF DESCRIPTION OF THE DRAWINGS

The following description of the drawings forms the same sequence as the detailed explanation of the invention which follows immediately afterward.

FIG. 12 is the numerical integration program giving the solution for all cases and variations of rectilinearly moving heads (i.e. Second Approach).

FIG. 13 is the numerical integration program giving the solution for all cases and variations of rotationally moving heads (i.e. Third Approach).

DESCRIPTION OF THE PREFERRED EMBODIMENTS

To implement the objects of this invention we begin by finding continuous paths on the disc, having as an equation in polar coordinates $\theta = f(r)$ in general, starting from a certain radius $r_i$ at the assumed innermost track and ending near the edge at another radius $r_o$ assumed to be that of the outermost track, and such that their inclination at any of their points to a circular track at that point, $\phi = \tan^{-1}(dr/rd\theta)$, equals the required head gap slant angle complement, and using the disc center as pole.

These paths will be exactly the locus of the information elements that can be transformed coherently into long lines, defined in the prior art as "elemental", spanning all tracks. Each elemental line is a boundary between the two states of magnetization and will be smooth where its particular elements do not change, or will contain minute wiggles where its elements do change, each wiggle being the smallest acceptable change for the system. Hence each elemental line will be the TPP chosen.

As a first approach the path for constant head output will be determined. It is known that the head output, in voltage and in frequency content, is proportional to the track radius, neglecting secondary effects such as the change in flying height. It is also known that this output, in voltage and in frequency content, is also proportional to $\sin\phi$. Hence if $\sin\phi = r_i/r$, the output will be constant and independent of both $r$ and $\phi$. Since for any continuous curve in polar coordinates $\sin\phi = dr/dS$ and also $(dS)^2=(dr)^2+r^2(d\theta)^2$, it follows that $rdr=r_idS$ or $r^2dr^2=r_i^2dr^2+r_i^2r^2d\theta^2$ and by solving for $d\theta$ and integrating, the path is $\theta=(1/r_i)\sqrt{r^2-r_i^2}-\tan^{-1}(\{1/r_i\}\sqrt{r^2-r_i^2})$ which is an involute, with $r_i$ its basic circle radius, the basic circle being concentric with the magnetic disc.

Let us find now the path for constant SNR head outputs. It is known that $SNR=k/(\{TPI\}\{BPI\}^2)=k_1(\text{track width})(\text{track radius})^2$, hence if the track width is inversely proportional to the square of the radius, or if $\sin\phi=r_i^2/r^2$ the head output will be of constant SNR equal to that of the track of radius $r_i$. Using the same fundamental considerations as above, it follows that $r^2dr=r_i^2dS$ or $r^4dr^2=r_i^4dr^2+r_i^4r^2d\theta^2$ and by solving for $d\theta$ and integrating, the path is $\theta=(\frac{1}{2}r_i^2)\sqrt{r^4-r_i^4}-(\frac{1}{2})\tan^{-1}(\{1/r_i^2\}\sqrt{r^4-r_i^4})$ which is not an involute but it resembles one. It can be very closely approximated by an involute having a basic circle of 0.75 $r_i$ radius whose center is shifted by 0.25 $r_i$ from the magnetic disc center.

Figures 1, 1A:
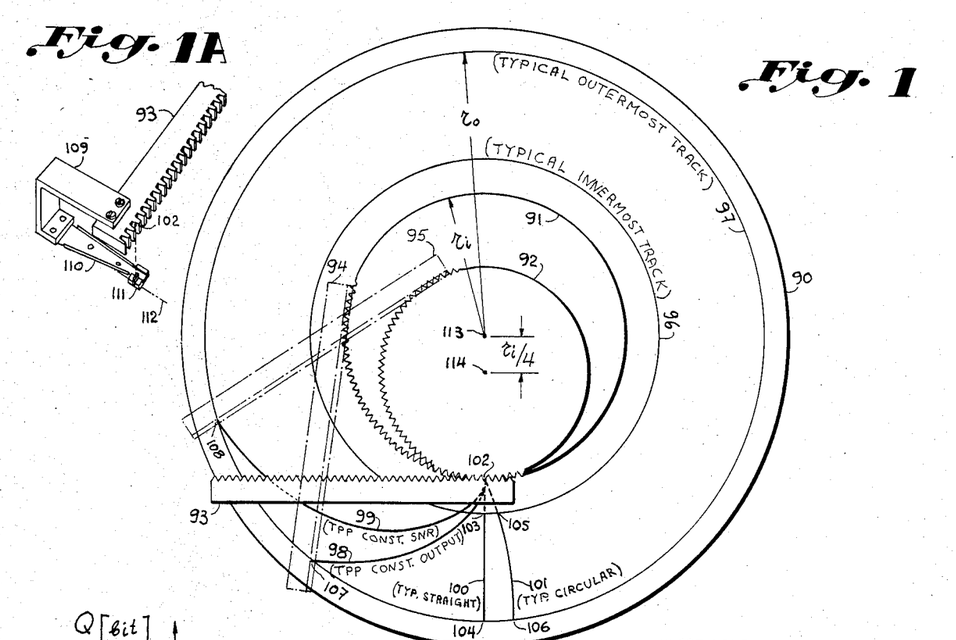
FIG. 1 is a schematic diagram showing the two extreme choice TPPs, one for constant output and the other for constant SNR, the stationary gears, and see-sawing toothed racks for their generation. Also shown are two typical head paths for ordinary machines, one rectilinear and the other rotational.
FIG. 1A shows a typical head assembly rigidly mounted on its toothed rack, with its gap plane perpendicular to the rack axis and the gap's middle point coinciding with its pitch plane. This drawing illustrates the First Approach head mounting whereby the gap is tangent to the apparent path.
Figures 2, 3:
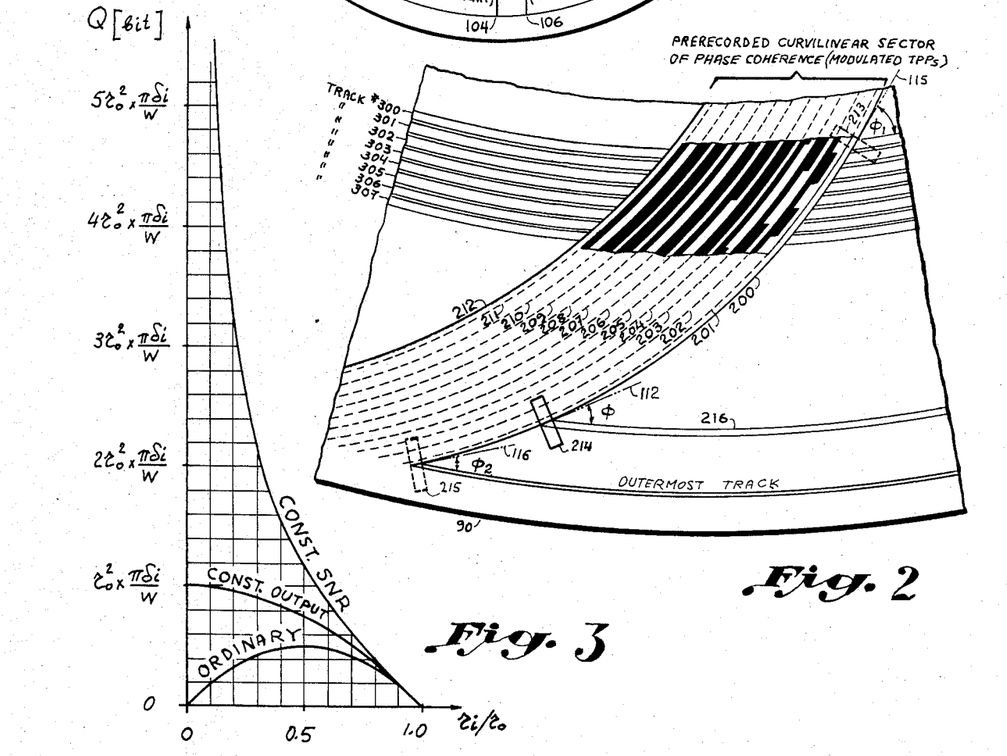
FIG. 2 shows a greatly enlarged section of a magnetic disc, a few tracks to the left and to the right of a curvilinear address sector which has been coherently recorded in binary Gray code.
FIG. 3 shows in normalized form the maximum capacity of a magnetic disc surface versus the dimensionless ratio $r_i/r_o$, for three cases of magnetic recording: Ordinary, Constant Output, and Constant SNR.

FIG. 1 illustrates schematically all the above. The magnetic disc 90 rotates around center 113. For the proportions shown a typical outermost track would be 97 having as radius $r_o$. Since in ordinary machines maximum storage capacity is obtained when the innermost track radius $r_i$ equals $r_o/2$, as shown in FIG. 3, the basic circle radius for the constant output choice is made equal to that, as a reasonable example, in the form of the stationary gear 91, centered at 113. A toothed rack starts from position 93 and being continuously engaged with the gear 91 ends in position 94, while its pitch plane point 102, originally in contact with the gear's pitch circle at point 102, starts from that position and ends in position 107 thus tracing the constant output TPP, involute 98, from the innermost to the outermost track.

Also shown is the shifted and smaller stationary gear 92 centered at 114 on the straight line 113–102 whose pitch circle forms the constant SNR choice basic circle. For purposes of comparison gears 91 and 92 are shown as having the same origin 102 for their respective tracks and TPPs. Hence the rack generating the constant SNR path also starts from position 93 but ends in position 95, being in continuous engagement with gear 92, while its pitch plane point 102 ends in position 108 thus tracing involute 99, the constant SNR TPP. As a third choice, other paths between the extreme TPPs 98 and 99 can be obtained starting from position 102 and ending at some point between points 107 and 108, by using the same rack 93 as before but engaging it with another basic circle formed by a stationary gear also centered on the straight line 113–102 and between points 113 and 114 and placed in between the gears 91 and 92. The pitch circle of this new gear will also pass through point 102 and will be in tangential contact also with the innermost track, in order to achieve TPPs having neither constant output nor constant SNR but some characteristic in between these extremes.

For comparison two head paths from typical machines are shown, 100 being representative of rectilinearly moving heads, and 101 representative of rotationally moving heads, the first between points 103 and 104 and the other between points 105 and 106. Finally, a typical innermost track, 96, is also shown. Again for comparison paths 100 and 101 are constructed to coincide with 102.

On FIG. 1A a head 111 is mounted directly on its rack 93 by means of the Ushaped bracket 109 and the flexible holder 110. This drawing illustrates how in the First Approach where a mechanism is used directly, that is without the delaying function g(r) to generate the effective TPP, the head gap line 112 (line-double dot-line henceforth) must be tangent also to its apparent path. Since in racks generating involutes by engaged rotation with stationary gears their axis, or their pitch plane, is always perpendicular to these curves, gap line 112 is also perpendicular to the pitch plane and the gap center is positioned directly under the pitch plane point 102.

An additional advantage in having strongly curved TPPs is that they can be considerably longer than the rectilinear or the mildly curved circular head paths of current practice, hence no better accuracy is needed to increase the total number of tracks. For example, if the constant output involute is chosen, 98 in FIG. 1, its length is 1.50 times longer than path 102–104. If the constant SNR involute 99 is chosen then its length is 2.33 times longer. A head having a nominal width w moves on both curves, or any other TPP, at constant and uniform steps but on the disc the effective steps and track widths are progressively becoming smaller toward the disc edge, but for all involutes the track width at the innermost radius is at maximum and equal to w. Hence the characteristics of the innermost track are preserved in their fullest integrity. It follows that the above increases in path lengths will result in increased track numbers and storage capacity also by a factor of 1.50 in the first case and a factor of 2.33 in the second.

Figures 4, 5, 6, 7, 7A, 7B:
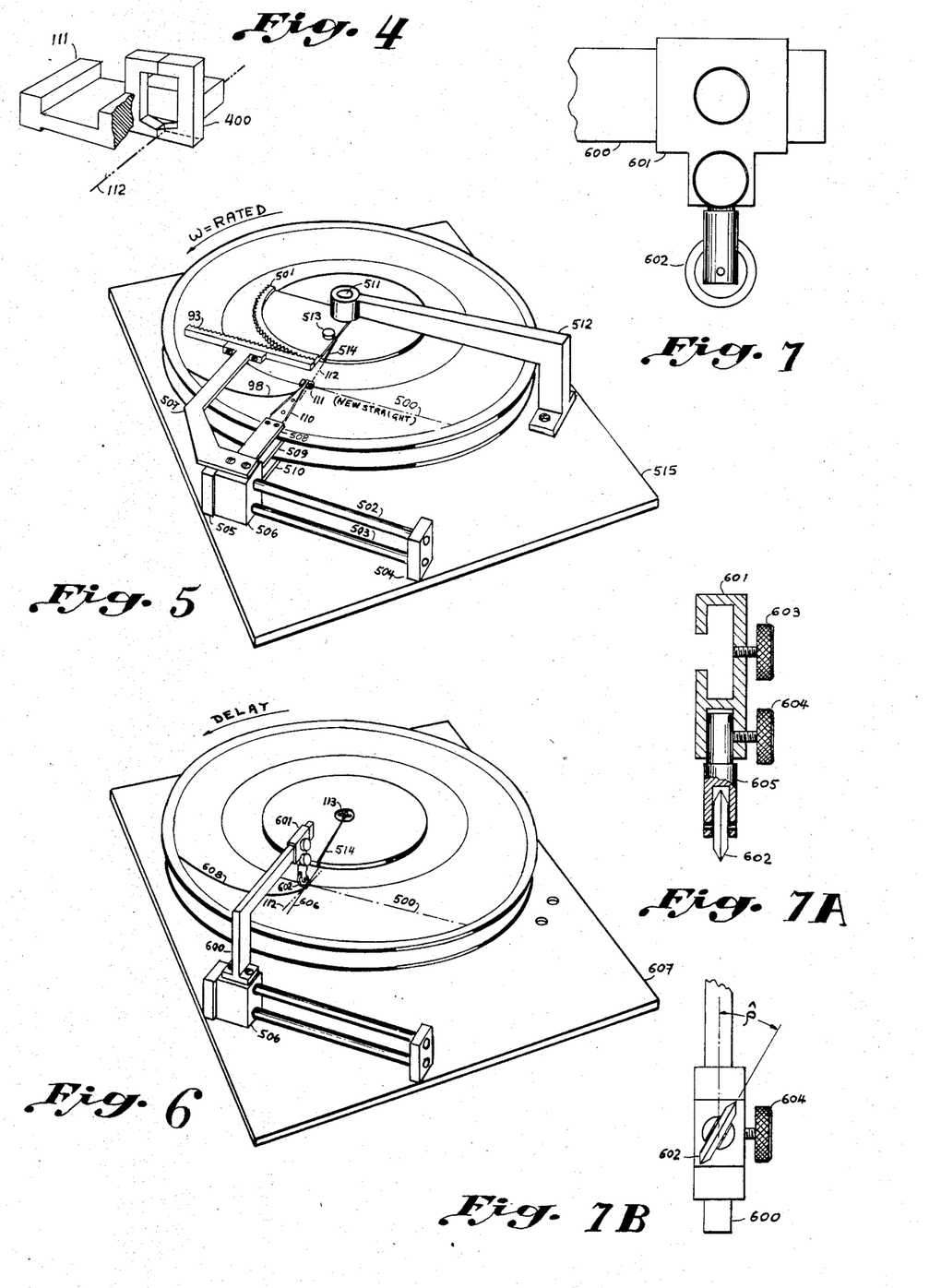
FIG. 4 is a perspective view of a magnetic head, its gap line, and its gap center.
FIG. 5 is a perspective view of a disc stack served by a rectilinearly moving set of heads, illustrating a possible implementation of the Second Approach of the constant output case, the delaying of the disc index being accomplished by the motion of the rack.
FIG. 6 is a perspective view of a disc stack served by a rectilinearly moving carriage on which instead of heads the Glazier's Wheel Integrator is mounted. This drawing illustrates the Second Approach for all cases.
FIG. 7 is a front view of the Glazier's Wheel Integrator.
FIG. 7A is a section of the Glazier's Wheel holder showing the provisions for height and angle $\rho$ adjustment.
FIG. 7B is a bottom view of the Glazier's Wheel holder.

FIG. 3 illustrates how the total storage, Q, of a machine can be augmented and where the maximum benefits occur. There $\delta_i$ is the innermost track packing density as defined earlier in transitions per inch (and is a design constant of the system), $r_o$ is the outermost radius in inches, and w is the head width in inches. FIG. 2 shows how the foot print of the head, 214, is always oriented such that the gap line 112 is tangent to the TPP which for the head position shown is line 200. The head is shown as just having finished processing track 216 and being about to begin reading a prerecorded sector encompassed by lines 200 to 212. Also shown is the gap inclination angle $\phi$. Two additional head foot-prints are shown, 215 at the outermost track with gap line 116 and inclination $\phi_2$, and 213 at the inner track #300 with gap line 115 and inclination $\phi_1$. It is to be noted that $\phi_1$ is larger than $\phi_2$ hence track #300 is considerably wider than the outermost one. Within the phase coherence sector 200–212 we have, in this example, the track address prerecorded in binary Gray code, with the binary and digital cells formed by consecutive TPP pairs, 201–202, 202–203, . . . 210–211, and with the first pair being the least significant digit (LSD) and the last being the most significant (MSD). The code is read by observing the magnetization state shown in white: $\frac{2}{3}$ of the cell means "zero", $\frac{1}{3}$ of the cell means "one". Using this code, the magnetization states of the address are shown to illustrate the meaning of coherence and of trackless recording in the regions where coherence occurs. The tracks outside the shown sector are not affected. FIG. 4 shows a partially sectioned perspective view of a typical head of the type known as "composite", 111. The magnetic part 400 has a gap underneath, the extension of which is the gap line 112. Since all heads are in a very close proximity with their respective disc surfaces a stricter definition of the gap line 112 is that it is intersection of the gap's plane and the disc surface. The head's footprint is the projection on the disc surface of the head face closest to it. And the gap center is the middle of the gap projection on the disc.

Returning now to FIG. 1 it should be noted that the arrangement shown is not easy to implement in spite of its simplicity because there is no convenient method to support the seesawing racks around their respective gears. However, it should be considered that the four paths shown, 98, 99, 100, and 101, are the ensembles of all imprints recorded by each of their respective mechanisms at a particular angular position of the spinning disc: For example when the disc index is detected by its detector. Or if not that angular position then other angular positions, but each at a fixed angular relationship with the index until each path is completed by its respective mechanism by recording one magnetic transition (and of the same direction) per track. Hence the same TPP can be produced by inverting strategically some of the relative motions involved.

FIG. 5 presents an easy inversion for the case of the constant output involute TPP, curve 98 of FIG. 1. The same head 111 is made to move here rectilinearly on the apparent path 500, but with its gap 112 at 90° to it, by the carriage 506 sliding on rods 502, 503 which are supported by the blocks 504 and 505. These blocks are firmly attached on frame 515. All heads are mounted on said carriage by means of the arms 508, 509, and 510, while the rack 93, mounted also on said carriage by arm 507, rotates the gear sector 501 which has the same pitch radius $r_j$ as the gear 91 of FIG. 1. The gear sector 501 supports the index detector 513 able to detect index line 514, for example optically, and is able to rotate around its pivot 511. Thus the motion inversion is complete: Path 98 of FIG. 5 is identical to path 98 shown on FIG. 1.

Here is the reason: Assume that sector 501 is restricted from rotating around pivot 511 for the moment and that it is fixed as shown relative to the support arm 512, and that supporting blocks 504 and 505 are freed from the base 515. Then the situation returns to the state of FIG. 1 assuming that the rack and its sector are in continuous engagement and that the discs are stationary. Since the discs rotate, the path is the TPP produced at the instant the index 514 is detected by its detector 513, now stationary, at every rotation and at every radius; hence the path 98 is the same as when the discs are stationary. It can be realized by those skilled in the art that the concentric to the magnetic discs involute 98 of FIG. 5 can be created by other means than by mechanically delaying the occurrence of the index. This delay, for example, can be achieved by an electronic network whereby the delay $\tau = k_2$ is proportional to the head's rectilinear travel x starting from the innermost position, and that the constant $k_2 = \frac{1}{2}\pi\omega r_i$. By changing $k_2$ any concentric involute can be achieved given the disc angular velocity $\omega$. Or the delay can be a function of the track radius, $\tau = g(r)$; or equivalently a function of the track number N, etc. As for the remaining cases, the concentric involute based on rotationally moving heads and the two eccentric involutes, one based on rectilinear and the other on rotationally moving heads, there is no easy inversion.

Figure 10:
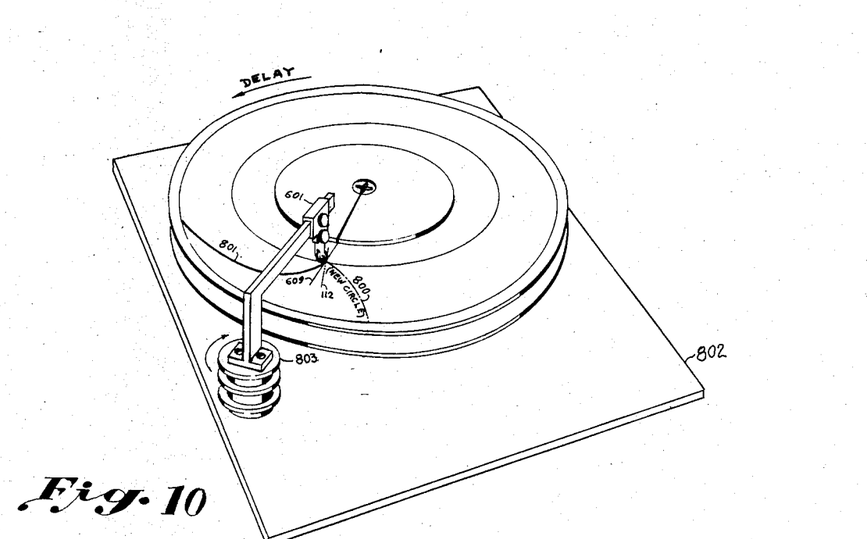
FIG. 10 is a perspective view of a disc stack served by a rotationally moving arm on which instead of heads the Glazier's Wheel Integrator is mounted. This drawing illustrates the Third Approach for all cases.

The problem of finding an index-delaying function versus the track radius which would enable heads moving on rectilinear or circular apparent paths to trace effective TPPs resembling involutes, concentric or eccentric, is solved by devising an integrator with a sharply-edged wheel like a cutter used by glaziers, shown on FIGS. 7, 7A, and 7B. This device incorporates a sharp wheel 602, free to turn on its axis, held by the cylindrical fork 605 which fits into holder 601 and is held there by the height adjusting screw 604. In turn the holder 601 fits on the integrator arm 600 and is held there by the length adjusting screw 603. The arm 600 can be mounted either on the rectilinear carriage 506 (FIG. 6) or on the rotational head mover 803 (FIG. 10).

The purpose of the wheel integrator is to indicate rapidly if an effective TPP is possible, the range of the paths produced by every set of design values, the inner and outer limits of each path (since the innermost possible point will exhibit a cusp like any involute and the outermost possible point may degenerate into a concentric circle within the disc unlike involutes which are endless spirals), the length of the path which is indicative of the improvement in storage capacity expected, the inclination angle $\phi$ at all points, and finally the required delay $\tau$ for each track radius.

Here is how it is used: It is mounted either on a carriage as in FIG. 6 or on a mover as in FIG. 10 directly over an expendable disc which is mounted normally on its spindle, and the glazier's wheel is adjusted in height to contact with a a reasonable force the disc's surface sufficient to produce visible and permanent indent marks. After setting the wheel's plane at an angle $\rho$, say of 10°, with the normal direction to its travel if rectilinear (FIG. 6, angle 112–606), or with the head arm's axis if rotational (FIG. 10, angle 112–609), and setting the position of holder 601 on its arm to be at a reasonable place, the operation begins by urging manually the disc to rotate slowly in its intended direction, while also urging manually the integrator holder to progress in its intended direction. Thus, the glazier's wheel will produce a permanent trace on the disc's surface from the innermost to the outermost track radius. Obviously many such traced paths can be made one for each new adjustment. All indicate with excellent accuracy the various effective TPPs. The required delay $\tau$ is the total rotation of the disc from the innermost radius to any given radius.

Here is how it works: A still better understanding of the integrator's usage will be derived by considering the vector diagrams of FIG. 9 for the rectilinear and FIG. 11 for the rotational approach. The plane of the glazier's wheel represents the gap line shown in both diagrams and the vertical axis of the cylindrical fork 605 of FIG. 7A represents point C of the diagrams. Since the wheel digs into the disc surface and since its plane ordinarily is neither parallel to the carriage path, x, FIG. 9 nor perpendicular to the arm's radius at point C, FIG. 11 it prevents the carriage or the arm, as the case may be, from moving unless, of course, the disc is permitted to rotate simultaneously. In this experiment the only meaning attached to this rotation of the disc by an angle $\theta'$ (equal to $\theta + \theta\gamma$—see FIGS. 9 and 11) is that it must be precisely the delay intervening, in terms of the magnetic disc's rotation, from a given position of the head gap's center C to the actual position of recording C' in order to produce the effective TPP, $C_1C'C'_2$ which is the only possible curve for the glazier's wheel, and is also a desirable ensemble of magnetic imprints since all are arrayed head-to-tail. Thus it is the delay which transforms the apparent TPP, $C_1C C_2$, which is also an impossible curve for the glazier's wheel to follow while being an undesirable ensemble of imprints since they are very misaligned, into the coherent and effective TPP.

Figure 9:
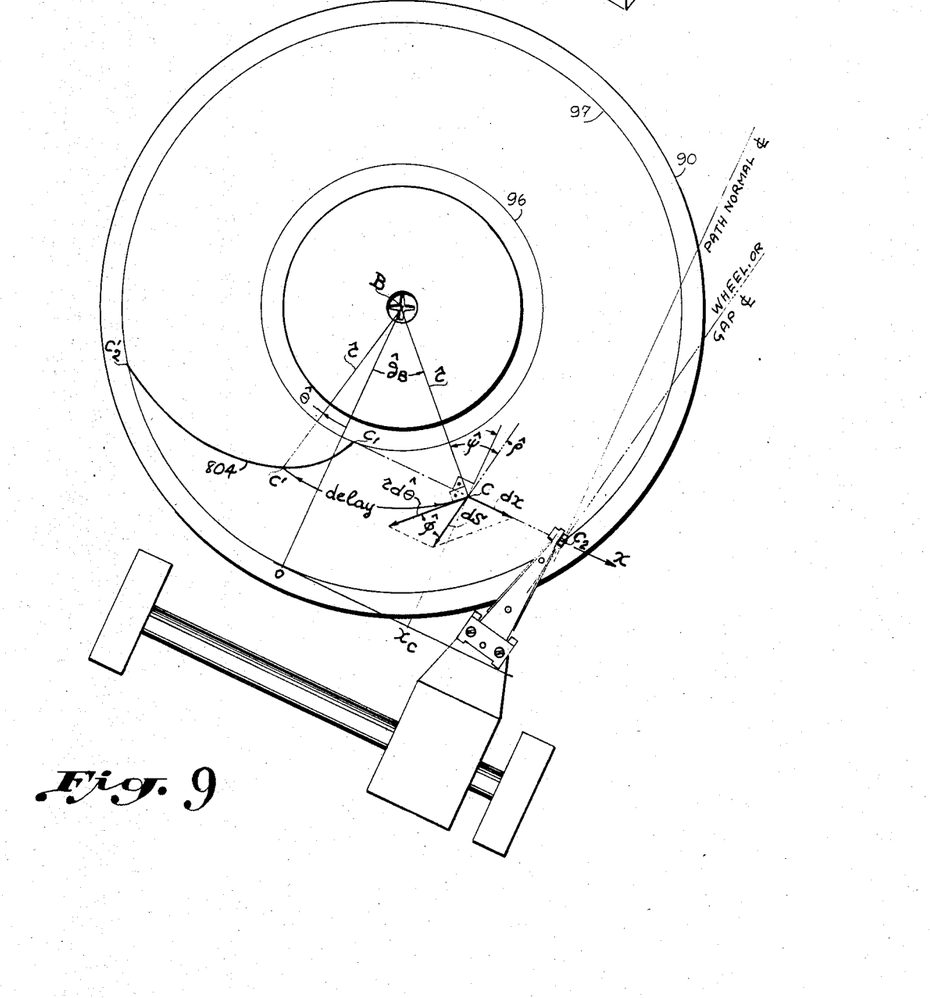
FIG. 9 is a schematic diagram showing the vectors involved in the differential equation of the general implementation of the Second Approach.
Figure 11:
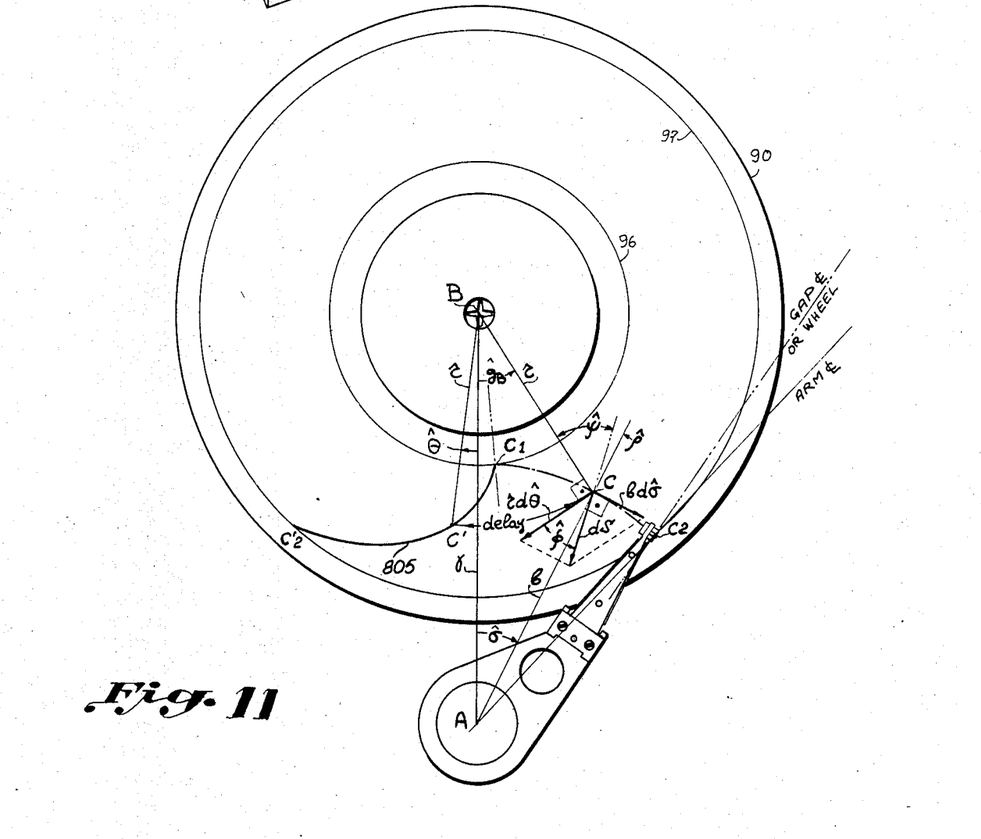
FIG. 11 is a schematic diagram showing the vectors involved in the differential equation of the general implementation of the Third Approach.

The integration of the differential relations in the vector diagrams, depicted by FIG. 9 and FIG. 11, is difficult; but because the heads move at constant intervals on the chosen effective TPPs, one interval ΔS per track and uniformly, a numerical integration is possible and actually more desirable because of the availability of inexpensive computers and programmable calculators. The program solutions are shown on FIG. 12 for the rectilinear case, and on FIG. 13 for the rotational. The user's instructions are included and both programs can be used readily with a Hewlett-Packard HP 97 calculator.

Two examples of the usage of these programs will be given in the form of calculated curve characteristics, one for rectilinearly moving heads whereby curve 804 of FIG. 9 is drawn to scale and and the other for rotationally moving heads from which curve 805 of FIG. 11 is drawn, also to scale.

The parameters for curve 804 are: $r_i = 1.185$ in., $r_1 = 1.190$ in. (the innermost track chosen), $\rho = 10°$, $\Delta S = 0.001776$ in. (sum of chosen head width and guard band, unslanted), $\nu = 47.227732$ μs/degr (standard parameter for the usual Winchester rotational period). The curve is drawn from the computed values printed-out every 100 tracks of Program E, FIG. 12.

Curve 805 of FIG. 11 is constructed using the parameters of a typical Winchester Drive memory, a model Q520 made by the Quantum Corporation of Milpitas Calif., whose mildly circular apparent TPP starts from $r_1 = 1.470$ in., ends at $r_2 = 2.370$ in., with a head radius $\beta = 2.750$ in., records in this interval 512 equidistant tracks with the assumed track interval $\Delta S = 0.001776$ in., and where the distance between the head arm pivot point A and disc center point B is $\gamma = 3.409$ in.

The numerical integration is done using program e of FIG. 13 by using the following parameters: $\gamma =$ same, $\beta = 2.160$ in., $r_1 = 1.260$ in. with a print-out at 1.470 in.), $\rho 9°$, $\Delta S =$ same, $\nu = 47.22773211$ μs/degr (calculated for the Quantum rotational period, $\nu = 10^6/(60 \times RPM)$), $r_2 = 2.370$ in., n = 100 (track interval per print-out, however the integration proceeds from track to track for every track). The following table has the results:

| N (Track No) | $\tau$(μs) | r(radius) | $\sigma$(degr) | $\theta$(degr) | $\phi$(degr) |
| --- | --- | --- | --- | --- | --- |
| 0 | 0.0 | 1.2600 | 3.5083 | 6.0215 | 89.4701 |
| 100 | 892.349 | 1.4279 | 14.5847 | 3.5210 | 61.9997 |
| 127 | 1,033.061 | 1.4695 | 16.3405 | 2.5813 | 58.2042 |
| 200 | 1,355.936 | 1.5742 | 20.2901 | −0.2712 | 50.2706 |
| 300 | 1,720.339 | 1.7022 | 24.5693 | −4.5565 | 42.5607 |
| 400 | 2,034.095 | 1.8153 | 28.0622 | −9.0074 | 36.8753 |
| 500 | 2,316.237 | 1.9159 | 31.0282 | −13.4944 | 32.4222 |
| 600 | 2,576.524 | 2.0062 | 33.6051 | −17.9600 | 28.7996 |
| 700 | 2,820.729 | 2.0874 | 35.8774 | −22.3781 | 25.7745 |
| 800 | 3,052.583 | 2.1609 | 37.9020 | −26.7374 | 23.2000 |
| 900 | 3,274.658 | 2.2276 | 39.7196 | −31.0344 | 20.9772 |
| 1,000 | 3,488.808 | 2.2882 | 41.3606 | −35.2690 | 19.0363 |
| 1,100 | 3,696.416 | 2.3436 | 42.8489 | −39.4433 | 17.3265 |
| 1,151 | 3,800.129 | 2.3699 | 43.5554 | −41.5500 | 16.5307 |

It is to be noted that the curve contained in the above table is, as described earlier, In-Between the constant output and the constant SNR approaches because the enhancement ratio exceeds 1.5 in terms of the ratio of the total number of new tracks divided the original track number.

Figure 8:
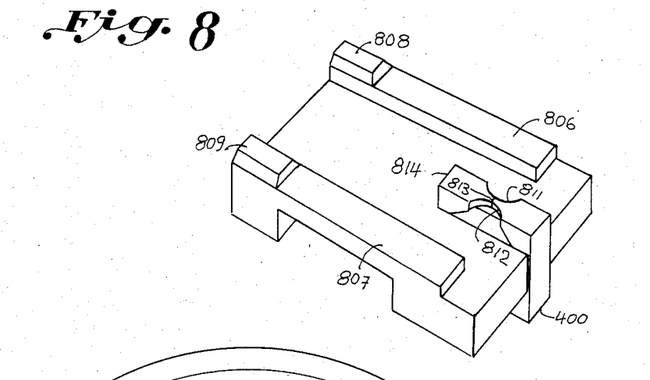
FIG. 8 is a perpective view of one embodiment for a head, modified by excavating the rails of its slider partly in order for it to fly and generally able to perform well with approximately 70° of slant angle variation.

Had a constant output curve been desired, here are the parameters for the same machine's original specifications: $\gamma =$ same, $\beta = 2.370$ in., $r_1 = 1.185$ in., $\rho = 27.5°$, $\Delta S =$ same, $\nu =$ same, which by using the same program, as in FIG. 13, gives an enhancement ratio approximately of 1.50. It was realized after lengthy experimentation that the original heads, also known as "IBM 3340 Winchester" could not maintain proper separation from the disc surface because of the extreme variation of the slant angle. A solution has been found and is presented in pictorial form in FIG. 8. There an IBM 3370 ceramic slider with a ferrite core is shown, a combination commonly known in the industry as a "composite" head, but which has been modified by having the two edge rails excavated by about 0.015 in. for approximately 70% of their original extent, leaving at either extreme an unexcavated protrusion extending to the original surface (that is the face of the head, the closest head surface to the disc surface being processed). In this drawing, 400 is the ferrite core, 806 and 807 are the excavations, 808 and 809 are the protrusions, that is the part of the slider left unmachined. Thus the face 810 of the ferrite core, together with protrusions 808 and 809 form the surface contributing to the flying characteristics of the modified head. The additional round cuts 811 and 812 are made in order to decrease significantly the inductance of the head for the given track width 813. It was found that by using a considerably thicker core (about 25 times) than the resulting track width due to the cuts 811 and 812, the head's inductance decreases proportionally to the total depth of the cuts, that is $L^{-1} = k_3$ (core width)/(gap width), and of course it is also stronger mechanical An applicable document in relation to the flying height considerations above can be the following paper: White, J. W., "Flying Characteristics of the 3370 Type Slider on a 5.25 Inch Disk, Part One: Static Analysis," Tribology and Mechanics of Magnetic Storage Systems, ASLE SP-16 (1984). Another applicable document is U.S. Pat. No. 3,349,384 by Kohn.

What is claimed is:

1. A disc memory storage device for recording and reading information magnetically, comprising:
   a rotating set of parallel discs having a plurality of concentrically arranged circular storage tracks serviced by a plurality of magnetic heads, one or more per disc surface, and each provided with an operative gap for transducing information to and from said tracks; and
   means for displacing each of said heads on a path substantially in the form of an involute of a circle, the gap of each of said heads being substantially tangent to said path, said involute path having a basic circle substantially concentric with the magnetic disc center and whose radius is equal to the radius of the innermost track serviced.

2. The device of claim 1 wherein said concentric basic circle is of smaller radius than the radius of the innermost track serviced.

3. The device of claim 1 wherein said basic circle is eccentric with the magnetic disc center and whose radius is smaller than the radius of the innermost track serviced by an amount equal to the eccentricity of the involute's basic circle from the magnetic disc center.

4. The device of claim 1 wherein said basic circle is eccentric with the magnetic disc center and whose radius is smaller than the radius of the innermost track serviced by an amount larger than the eccentricity of the involute's basic circle from the magnetic disc center.

5. A disc memory storage device for recording and reading information magnetically, comprising:
   a rotating set of parallel discs having a plurality of concentrically arranged circular storage tracks serviced by a plurality of magnetic heads, one or more per disc surface, and each provided with an operative gap for transducing information to and from said tracks;

means for displacing each of said heads on a path substantially rectilinear, the gap of each of said heads being substantially perpendicular to said path; and means for delaying the issuing of the disc index or clock and hence the recording directly proportional to the travel of said heads, starting from their innermost position.

6. The device of claim 5 wherein said means of delaying the issuing of the disc index or clock and hence the recording operates inversely proportional to the travel of said heads, starting from their innermost position.

7. A system for enhancing the storage capability of a disc storage medium storing information in a plurality of rotary tracks as a series of changes of state of the incremental storage medium induced by a transducer traversing the surface of the disc between inner and outer tracks as the disc rotates, the stored information being phase coherent from track to track with the imprints corresponding to changes of state for respective data elements between innermost and outermost tracks forming a plurality of elemental lines representing the transducer progress path, said system comprising:

a transducer positioning mechanism for supporting and driving the transducer to traverse the disc surface between inner and outer tracks; and means for controlling said mechanism to cause the transducer to traverse the disc surface between inner and outer tracks along a predetermined transducer progress path, thereby forming a plurality of elemental lines representing the storage of information on the disc, each elemental line being substantially an involute curve in the portion between innermost and outermost tracks.

8. The system of claim 7 wherein the mechanism includes means for driving the transducer along a transducer progress path which is an involute of a selected basic circle.

9. The system of claim 8 wherein said basic circle is concentric with the disc and has a radius which is less than the radius of the innermost track.

10. The system of claim 9 wherein said mechanism comprises a rack coupled to the transducer and engaging a sector gear extending about a portion of the basic circle and bearing a detector for sensing the position of an index element on the disc.

11. The system of claim 10 wherein the rack and the transducer are mounted on a slide which is rectilinearly movable along a fixed rod, the rectilinear movement of the rack and slide being effective to rotate the sector gear to control the effective position of the disc index for each track of the disc.

12. The system of claim 8 wherein the basic circle has a radius which is less than the radius of the innermost track and wherein the basic circle is eccentrically mounted for rotation about the center of the disc, the center of the basic circle being offset from the center of rotation.

13. The system of claim 7 wherein said disc storage medium comprises a plurality of magnetic discs assembled for common rotation in a stack, and wherein a plurality of transducers are mounted on said mechanism for recording information on various surfaces of the disc stack.

14. The system of claim 7 wherein the transducer positioning mechanism comprises an arm on which the transducer is mounted, said arm being supported for rotation about a pivot axis located outside the extent of the disc.

15. The system of claim 11 wherein the data being recorded on the disc is delayed in position by a delay interval which is proportional to the angle between the transducer progress path and point of detection of the disc index for each individual track.

16. The system of claim 7 wherein the disc storage medium is a magnetic medium and wherein the transducer is a recording head having a gap for inducing selected magnetic states in the associated disc surface.

17. The system of claim 16 wherein the transducer is aligned such that the head gap is tangent to the transducer progress path throughout its extent.

18. The system of claim 7 wherein the involute curve for the elemental lines is selected to provide a constant output of information signals stored on the disc.

19. The system of claim 7 wherein the involute curve is selected to provide a constant signal-to-noise-ratio throughout the transducer progress path.

20. The system of claim 7 further including an implement for determining the range of feasible transducer progress paths for a given disc storage medium in the form of a glazier's wheel mounted in a fixture supported from an arm for travel across the surface of a disc in frictional engagement therewith as the disc is rotated to mark a potential transducer progress path on the disc.

21. The system of claim 20 wherein the glazier's wheel fixture is mounted on an arm extending from a slide which is constrained for movement in a direction generally parallel to a tangent to a disc track.

22. The system of claim 21 wherein said mounting fixture includes means for adjusting the angle of the glazier's wheel relative to the direction of said mounting arm.

23. The system of claim 20 wherein the arm is mounted for pivotable movement about a pivot axis which is offset from the extent of the disc.

* * * * *